(No Model.)
T. R. ALMOND.
SHAFT COUPLING.
No. 303,251. Patented Aug. 12, 1884.
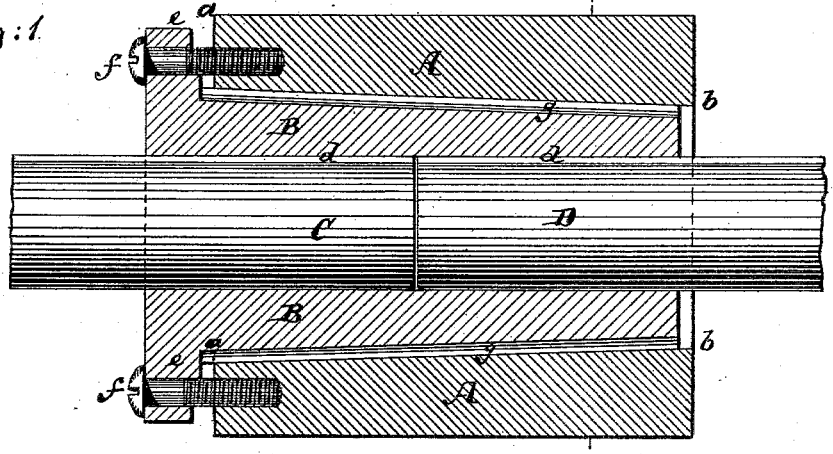
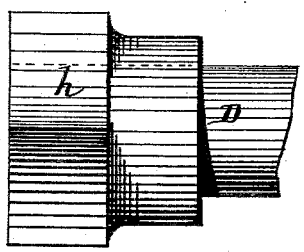
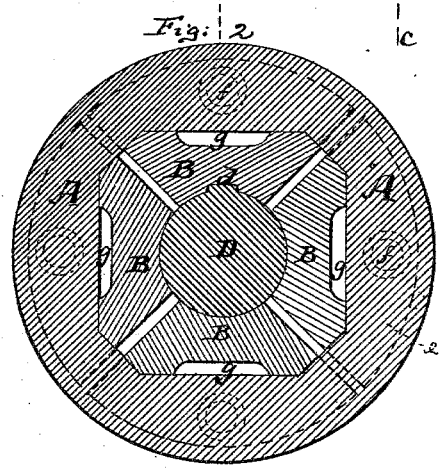
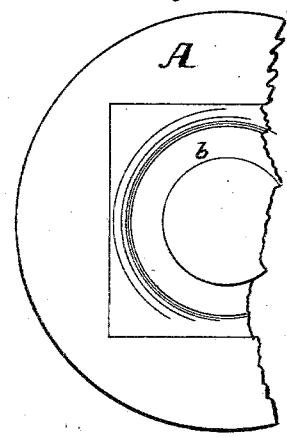
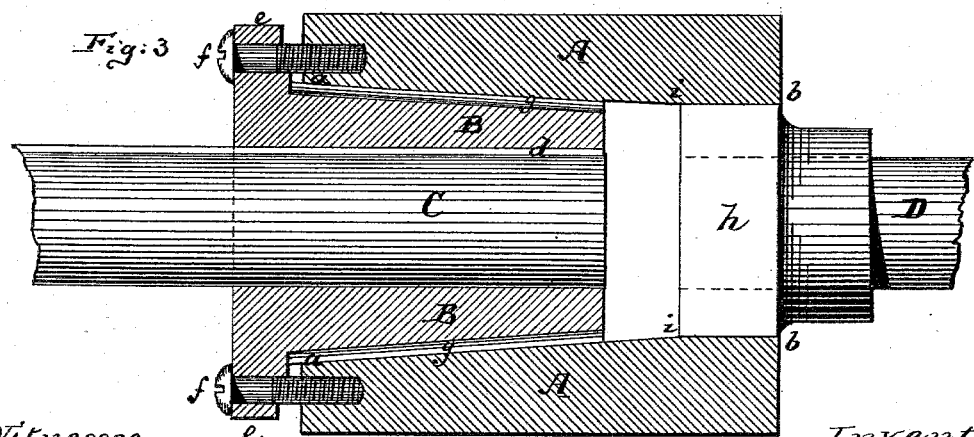
Witnesses
John C. Tunbridge
John M. Speer
Inventor:
Thomas R. Almond
by his attorneys
Briesen & Steele

UNITED STATES PATENT OFFICE.

THOMAS R. ALMOND, OF NEW YORK, N. Y.

SHAFT-COUPLING.

SPECIFICATION forming part of Letters Patent No. 303,251, dated August 12, 1884.

Application filed May 5, 1884. (No model.)

*To all whom it may concern:*

Be it known that I, THOMAS R. ALMOND, a resident of New York city, in the county and State of New York, have invented an Improved Shaft-Coupling, of which the following is a full, clear, and exact description, reference being made to the accompanying drawings, in which—

Figure 1 is a longitudinal central section of my improved shaft-coupling. Fig. 2 is a cross-section on the line *c c*, Fig. 1. Fig. 3 is a longitudinal central section of a modification of the invention. Fig. 4 is a detailed side view of one end of the shaft that is used in said modification, and Fig. 5 a detailed end view of the coupling used in that modification.

This invention relates to a simple contrivance for connecting two shafts; and the invention consists in combining a coupling-box having an inner angular aperture or passage of tapering form that extends from end to end through such coupling-box with wedges that are adapted to enter said tapering aperture and to encompass and clamp the contiguous ends of the shafts to be coupled, all as hereinafter more fully described.

In the accompanying drawings, with more particular reference to Figs. 1 and 2, the letter A represents the coupling-box, which externally may be of cylindrical form, as indicated in Fig. 2, and which internally has a passage through it extending from end to end, said passage being of angular form in cross-section. Thus, for instance, it is shown to be octagonal in Fig. 2; but it may be rectangular, or have any suitable number of sides. The passage is larger at one end, *a*, of the box A than at the other end, *b*, as is indicated in Fig. 1, being therefore flaring or tapering.

B B are wedges, and C D are the shafts to be coupled. The wedges are of such form and size as to fill the space between the inner walls of the box A and the outer circumference of the shafts C D—that is to say, when all the wedges are in place in the box A their inner sides form a tubular passage, in which the shafts C D can be received, while their outer sides form a truncated pyramid corresponding in form and size with the inner periphery of the box A. One of the wedges B has on the inner side a longitudinal groove to receive the feathers *d* of the shafts C D. At that end of each wedge which is the thicker end, each wedge has a head or flange, *e*, which is adapted to overlap the end *a* of the box A. Small screws *f* may be passed through these flanges or heads *e* into the end *a* of the coupling-box A, for the purpose solely of holding the wedges in place after they shall have been adjusted. For practical purposes it will be desirable to form a channel, *g*, along the outer face of each wedge B. This channel, which is clearly shown in Fig. 2, produces a better and more central bearing of each wedge against the shaft, and allows the wedges to be conveniently filed on the outer side if they should be too large.

The operation of the device as far as described is as follows: The shafts C D to be joined being preferably, but not necessarily, of equal diameters, the box A is slipped over their contiguous ends, and thereupon the wedges B B are driven in to fill the interstices between said shafts and the inner faces of the box until they bite the shafts. The screws *f* are then put in place to retain the wedges in the proper position. It will be perceived that by this means the shafts will be completely and thoroughly coupled, and that, nevertheless, whenever they are to be uncoupled no wrench or other special mechanism will be needed to disconnect them, for it will only then be necessary to take out the screws *f* and to drive the wedges out of the coupling-box by means of a hammer or similar apparatus.

The device has a greater degree of adjustability than any other coupling known to me, as the wedges can be driven into the box for biting the shafts and connecting them by means of a hammer or mallet, either to their full extent or to a sufficient extent merely to enable them to take a proper hold. Thus, in Fig. 1 the wedges appear not to have been fully driven home, as they already engage the shafts and connect them in the position in which they are represented.

The ease with which this contrivance can be used to unite shafts at places distant from the factory of the coupling will also recommend it to special favor, as will the ease with which it can be put in place and taken apart. The mechanism is simple, and not costly. It can be produced complete in a foundry, and will require no afterfinish, excepting that the holes for the screws will have to be bored.

The modification which is represented in Figs. 3, 4, and 5 applies to shafts, of which one, D, has a head, h, of angular form to match the angular opening in the end b of the box A. In this case the angular opening in the box A is made tapering only from the end a of the box to a place, i, into which the head h can be inserted. The wedges B B in this modification extend only around the shaft C, the shaft D being united to the coupling-box by its angular head. In every other respect the modification operates the same as the mechanism described with reference to Figs. 1 and 2, and the box A takes the strain of the shafts when the device is in operation. The wedges can be easily started for separating the shafts by inserting a prying device or pinch-bar between their flanges e and the end a of the box. The flanges e together form a circular finish at the end of the coupling and prevent injury to workmen, which might be occasioned by an angular projection.

I claim—

1. The coupling-box A, having angular tapering inner passage, combined with a single set of wedges, B B, forming a truncated pyramid, and having flanges e e, and forming inner tubular passage, substantially as herein shown and described.

2. The combination of the coupling-box A, having inner angular tapering passage, with the wedges B B, forming a truncated pyramid and having inner tubular passage, and flanges e, the wedges having channels g along their outer faces, substantially as specified.

3. The combination of the shaft C, single set of wedges B, forming a truncated pyramid, and having flanges e, and coupling-box A, having angular inner passage, with the shaft D, having angular head h, that is adapted to enter one end of said box A, substantially as herein shown and described.

THOMAS R. ALMOND.

Witnesses:
WILLY G. E. SCHULTZ,
JOHN C. TUNBRIDGE.